US008780258B2

(12) United States Patent
Lee

(10) Patent No.: US 8,780,258 B2
(45) Date of Patent: Jul. 15, 2014

(54) MOBILE TERMINAL AND METHOD FOR GENERATING AN OUT-OF-FOCUS IMAGE

(71) Applicant: Jinsool Lee, Seoul (KR)

(72) Inventor: Jinsool Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/646,615

(22) Filed: Oct. 5, 2012

(65) Prior Publication Data

US 2013/0088614 A1   Apr. 11, 2013

(30) Foreign Application Priority Data

Oct. 7, 2011   (KR) ........................ 10-2011-0102727

(51) Int. Cl.
*G03B 13/00* (2006.01)
*H04N 5/222* (2006.01)
*H04N 5/262* (2006.01)

(52) U.S. Cl.
USPC ....................... 348/345; 348/333.12; 348/239

(58) Field of Classification Search
None
See application file for complete search history.

(56) References Cited

U.S. PATENT DOCUMENTS

2008/0219654 A1* 9/2008 Border et al. .................... 396/89
2010/0080448 A1* 4/2010 Tam et al. ...................... 382/154
2011/0169921 A1* 7/2011 Lee et al. ......................... 348/46
2011/0227950 A1  9/2011 Suzuki
2012/0044400 A1* 2/2012 Okada et al. ............. 348/333.01

FOREIGN PATENT DOCUMENTS

| CN | 101632296 A | 1/2010 |
| EP | 2410377 | 1/2012 |
| JP | 2010521005 A | 6/2010 |

OTHER PUBLICATIONS

European Patent Office Application Serial No. 12006911.7, Search Report dated Feb. 1, 2013, 9 pages.
State Intellectual Property Office of the People's Republic of China Application Serial No. 201210370090.4, Office Action dated Dec. 19, 2013, 11 pages.

* cited by examiner

*Primary Examiner* — Aung S Moe
*Assistant Examiner* — Euel Cowan
(74) *Attorney, Agent, or Firm* — Lee, Hong, Degerman, Kang & Waimey

(57) ABSTRACT

Provided are a mobile terminal and a method for generating an out-of-focus image, whereby a preview image and a depth map are displayed when an out-of-focus function of the mobile terminal is selected by a user, the displayed depth map is adjusted based on a specific object that is selected from the displayed preview image, an image is captured via a camera of the mobile terminal, and an out-of-focus image is generated by blurring the captured image according to the adjusted depth map.

21 Claims, 10 Drawing Sheets

MOBILE TERMINAL AND METHOD FOR GENERATING AN OUT-OF-FOCUS IMAGE

CROSS-REFERENCE TO RELATED APPLICATION

Pursuant to 35 U.S.C. §119(a), this application claims the benefit of earlier filing date and right of priority to Korean Application No. 10-2011-0102727, filed on Oct. 7, 2011, the contents of which is incorporated by reference herein in its entirety.

FIELD OF THE INVENTION

The present invention relates to a mobile terminal and method for generating an out-of-focus image using a depth map and a preview image.

RELATED ART

Mobile terminals may be configured to perform various functions, such as data and voice communication, capturing images or video, storing sounds, playing music files, displaying images or video, playing games, playing multimedia content, and other similar functions. Mobile terminals may receive broadcast signals that allow viewing of video or television programs. Efforts are underway to enhance various functions of such mobile terminals, such as changes and improvements to their exterior structure, software and/or hardware.

A touch function of the mobile terminal allows a user to conveniently input signals using a touch screen in order to execute operations of the mobile terminal. The touch function is an important feature of the mobile terminal and its user interface (UI).

Generally, an out-of-focus effect applied to an image makes a foreground region of that image focused-in and a background region of that image focused-out. The out-of-focus effect may be obtained by using lens characteristics of sophisticated cameras (e.g., a digital single-lens reflex (DSLR) camera type, a hybrid camera type, or other similar camera types) or by image processing techniques utilized by less sophisticated cameras. In sophisticated camera, the out-of-focus effect may be obtained using a zoom lens or by setting a lower aperture size (i.e., opening the camera aperture).

If a camera produces the out-of-focus effect via image processing, two photos (e.g., a blurred image and an non-blurred image) are continuously photographed and combined together. When such an image processing method is utilized, more storage space is needed in a memory and more time is needed to capture and process those images than would otherwise be needed.

SUMMARY OF THE INVENTION

An aspect of the detailed description provided herein is to provide a mobile terminal and method for generating an out-of-focus image using a preview image and a depth map in a mobile terminal having a dual camera.

Another aspect of the detailed description is to provide a mobile terminal and method for more accurately generating an out-of-focus image using a depth map when a still image, a moving image, or a video is captured in a mobile terminal using a single camera.

A method for generating an out-of-focus image in a mobile terminal may include displaying a preview image and a depth map when an out-of-focus function is selected, adjusting the depth map based on a convergence of a specific object when that specific object is selected from the displayed preview image, and generating an out-of-focus image by blurring a captured image based on the adjusted depth map.

The preview image may be a still image, a moving image, or a video.

The depth map may be generated from preview images acquired by two cameras. The depth map may be displayed on one side of the preview image as a mini-map or displayed as overlapping the preview screen in a semitransparent form. The depth map may include a negative (−) convergence region and a positive (+) convergence region, which may be displayed with different colors.

The background region of the depth map may be blurred by an amount that is adjusted in response a control bar located at one side of the preview image or the depth map.

The depth map may be adjusted by setting a selected object as a zero-point of convergence, checking whether one or more objects with a negative convergence are present, displaying the corresponding one or more objects on a screen for user selection when the one or more objects with the negative convergence are present, extracting the corresponding one or more objects when the user does not select any of the one or more objects with the negative convergence, resetting the convergence of the extracted one or more objects to a positive convergence, and further adjusting the depth map based on the reset positive convergences.

Generating the out-of-focus image may include enlarging the adjusted depth map to a size that is similar to a size of the captured image, dividing the captured image and the depth map into a plurality of blocks, comparing the divided blocks based on their convergences, and performing Gaussian blur filtering to blur a positive convergence region of the captured image.

A mobile terminal that generates an out-of-focus image may include a display unit configured to display a preview image and a depth map, a memory configured to store a captured image, and a controller configured to adjust the depth map based on a convergence of a specific object selected from the preview image and to blur the captured image based on the adjusted depth map.

The size, shape, color and display time of the depth map may be set via an initial user menu or via a menu displayed when the depth map is selected.

The applicability of the present invention will become more apparent from the detailed description provided herein. It will be understood that the detailed description and specific examples provided herein, while indicating preferred embodiments of the invention, are given by way of illustration only, since various changes and modifications not mentioned explicitly herein are within the spirit and scope of the present invention and, thus, will become apparent to those skilled in the art.

BRIEF DESCRIPTION OF THE DRAWINGS

The accompanying drawings, which are included to provide an understanding of the present invention, are incorporated herein, and constitute a part of this specification, illustrate exemplary embodiments and serve to explain the principles of the invention.

In the drawings.

DETAILED DESCRIPTION OF THE INVENTION

A detail description will now be provided for certain configurations of the mobile terminal with reference to the accompanying drawings according to the certain exemplary embodiments of the present invention. The suffixes "module," "unit" or "portion" may be used with reference to certain components used herein and are merely provided for facilitating this specification; such suffixes are not granted a specific meaning or function.

Mobile terminals may be implemented using a variety of different types of devices. Examples of such devices include mobile phones, smart phones, notebook computers, digital broadcast terminals, personal digital assistants (PDA), portable multimedia players (PMP), navigators, stationary terminals, digital televisions (TVs), desktop computers, and other similar devices. The following description assumes that the device is a mobile terminal. However, it will be understood by those skilled in the relevant art that the following description can be applied to at least any of the devices indicated above.

Figure 1:
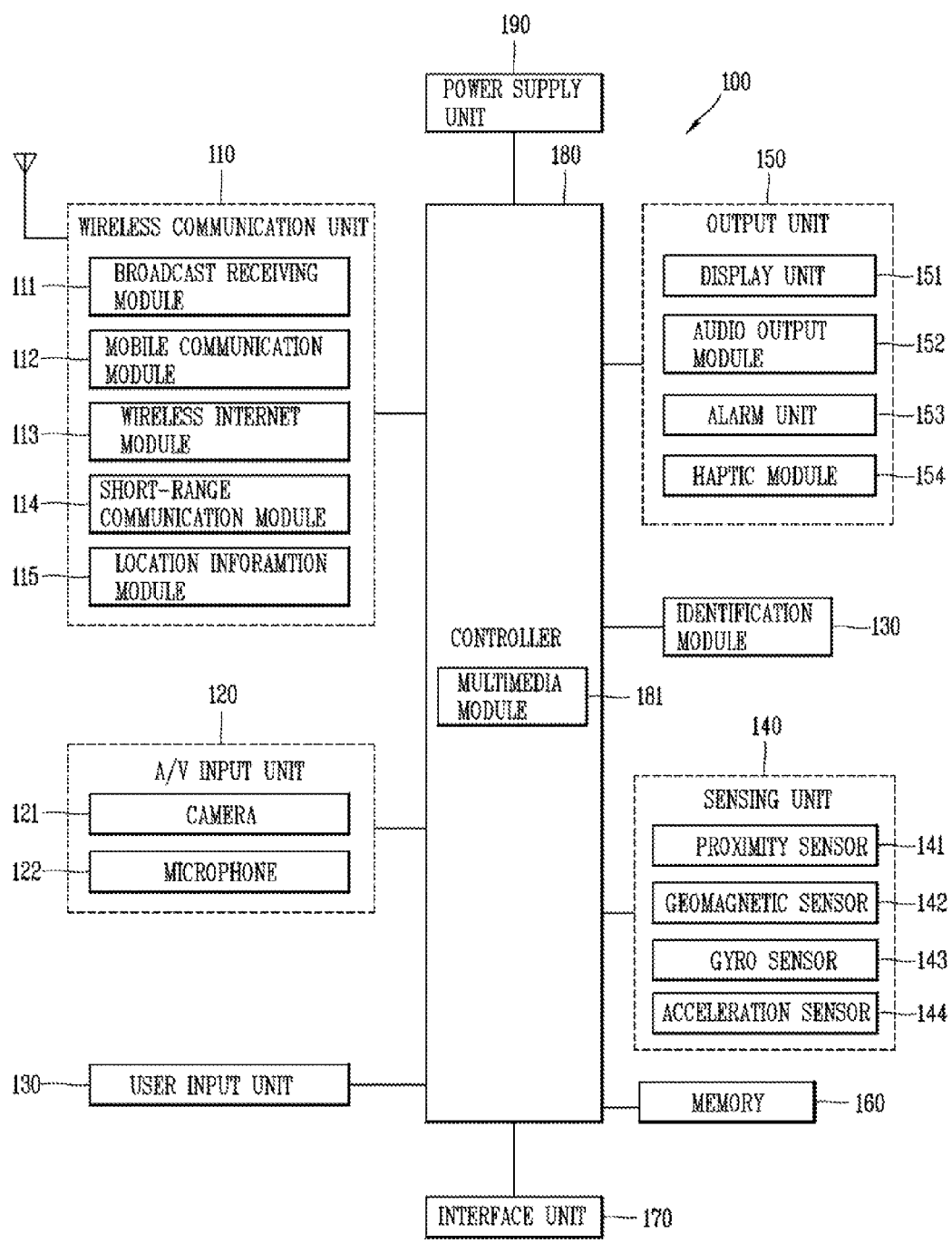
FIG. 1 is a block diagram of certain components of an exemplary embodiment of a mobile terminal.

As illustrated in FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, and a power supply unit 190. FIG. 1 shows the mobile terminal having various components, but it will be understood that implementing all of the illustrated components is not a requirement of the present invention. More or fewer components may alternatively be included in alternative embodiments.

The wireless communication unit 110 may include one or more components which permit wireless communications between the mobile terminal 100 and a wireless communication system (not shown) or between the mobile terminal and a network (not shown) to which the mobile terminal can be connected. For example, the wireless communication unit may include a broadcast receiving module 111, a mobile communication module 112, a wireless Internet module 113, a short-range communication module 114, a location module 115 and other similar components.

The broadcast receiving module 111 may receive broadcast signals and/or broadcast associated information from an external broadcast managing entity (not shown) via a broadcast channel.

Broadcast signals and/or broadcast associated information received via the broadcast receiving module 111 may be stored in a suitable device, such as a memory 160.

The broadcast channel may include a satellite channel and/or a terrestrial channel. The broadcast managing entity may indicate (i) a server that generates and transmits a broadcast signal and/or broadcast associated information or (ii) a server that receives a pre-generated broadcast signal and/or broadcast associated information and sends them to the mobile terminal.

The broadcast signal may be a TV broadcast signal, a radio broadcast signal, a data broadcast signal and/or other signal types. The broadcast signal may also include a data broadcast signal combined with a TV or radio broadcast signal.

Examples of broadcast associated information may include information associated with a broadcast channel, a broadcast program, a broadcast service provider, and other similar information.

The broadcast associated information may indicate information related to a broadcast channel, a broadcast program or a broadcast service provider. The broadcast associated information may be provided via a mobile communication network (not shown) and received via the mobile communication module 112.

The broadcast associated information may be implemented in various types of formats. For example, broadcast associated information may include Electronic Program Guide (EPG) of Digital Multimedia Broadcasting (DMB), Electronic Service Guide (ESG) of Digital Video Broadcast-Handheld (DVB-H), and other similar types of formats.

The broadcast receiving module 111 may be configured to receive digital broadcast signals transmitted from various types of broadcast systems (not shown). Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and other similar broadcast systems. The broadcast receiving module may be suitable for every broadcast system transmitting broadcast signals as well as digital broadcasting systems.

The mobile communication module 112 transmits and/or receives wireless signals to and/or from at least one network entity (e.g., a base station, an external mobile terminal, a server, or any other similar network entity) in a mobile communication network (not shown). The wireless signals may include an audio call signal, a video call signal, or various formats of data according to transmission and/or reception of text and/or multimedia messages.

The wireless Internet module 113 may support wireless Internet access for the mobile terminal 100. The wireless Internet module may be internally or externally coupled to the mobile terminal. Examples of wireless Internet access may include Wireless LAN (WLAN), Wireless Fidelity (Wi-Fi), Wireless Broadband (Wibro™), World Interoperability for Microwave Access (Wimax™), High Speed Downlink Packet Access (HSDPA), and other similar types of wireless Internet access.

The short-range communication module 114 may comprise a module for short-range communication. Suitable technologies for implementing such a module may include BLUETOOTH™, Radio Frequency IDentification (RFID), Infrared Data Association (IrDA), Ultra-WideBand (UWB), ZigBee™, and other similar technologies.

The location information module 115 may be configured for detecting or determining a position of the mobile terminal 100. The location information module may include a Global Position System (GPS) module (not shown), which can accurately measure time and distance information using at least three satellites according to a triangulation scheme. Any errors from time and distance information determined via such a triangulation scheme may be corrected. Also, the GPS module may continuously calculate position information in real-time in order to determine speed information.

The A/V input unit 120 may be configured to provide an audio and/or video signal input to the mobile terminal 100. The A/V input unit may include a camera 121 and a microphone 122. The camera may receive and process image frames of still images or video. The processed image frames may be displayed on a display unit 151.

The processed image frames may be stored in the memory 160 or transmitted elsewhere via the wireless communication unit 110. Two or more cameras 121 may be provided in the mobile terminal 100.

The microphone 122 may receive an audio signal while the mobile terminal 100 is in a phone call mode, a recording mode, a voice recognition mode, or other similar mode. This audio signal may be processed into digital data. The processed digital data may be converted for output into a format transmittable to a mobile communication base station (not shown) via the mobile communication module 112. The microphone may implement noise-removing algorithms in order to remove noise generated while receiving the audio signal.

The user input unit 130 may generate input data in response to an input by a user in order to control operation of the mobile terminal 100. The user input unit may include a keypad, a dome switch, a touchpad (e.g., static pressure and/or capacitance), a jog wheel, a jog switch and other similar data input components.

The sensing unit 140 provides status measurements of various aspects of the mobile terminal 100. For example, the sensing unit may detect an opened and/or closed state of the mobile terminal, a change in a location of the mobile terminal, a presence or absence of user contact with the mobile terminal, the location of the mobile terminal, acceleration and/or deceleration of the mobile terminal, a presence or absence of power provided by the power supply 190, a presence or absence of coupling or other connection between the interface unit 170 and an external device (not shown), and other similar aspects of the mobile terminal, in order to generate a sensing signal for controlling the operation of the mobile terminal.

The sensing unit 140 may include a proximity sensor 141. A slide-type mobile terminal (not shown), the sensing unit may sense whether a sliding portion of the mobile terminal is in an opened or closed state. The sensing unit may also include a geomagnetic sensor 142 configured to calculate a moving direction when the mobile terminal 100 is moved, a gyro sensor 143 configured to calculate a rotating direction of the mobile terminal, and an acceleration sensor 144 configured to calculate the acceleration and/or deceleration of the mobile terminal.

The interface unit 170 may couple the mobile terminal 100 to external devices (not shown). The interface unit may include wired and/or wireless headset ports, external charger ports, wired and/or wireless data ports, memory card ports, ports for coupling devices having an identification module (not shown), audio Input/Output (I/O) ports, video I/O ports, earphone ports, and other similar components.

The identification module 130 may be configured as a chip for storing various information required to authenticate an authority to use the mobile terminal 100. The identification module may include a User Identity Module (UIM), a Subscriber Identity Module (SIM), a Universal Subscriber Identity Module (USIM), and other similar modules. The identification module may a type of a smart card that may be coupled to the mobile terminal via a port (not shown).

The interface unit 170 may receive data or power from an external device (not shown) and either transfer the received data or power to other components of the mobile terminal 100 or transfer the received data to another external device. The interface unit may also serve as a path for power to be supplied from an external cradle (not shown) to the mobile terminal when the mobile terminal is connected to the external cradle. Additionally, the interface unit may serve as a path for transferring various command signals input from the cradle by a user to the mobile terminal. Such command signals or input power may operate as signals for recognizing that the mobile terminal has been mounted to the cradle.

The output unit 150 may be configured to output an audio signal, a video signal or an alarm signal. The output unit may include a display unit 151, an audio output module 152, an alarm unit 153, a haptic module 154, and other similar components.

The display unit 151 may output information processed in the mobile terminal 100. For example, when the mobile terminal is operating in a phone call mode, the display unit may provide a User Interface (UI) or a Graphic User Interface (GUI) that includes information associated with the phone call.

The display unit 151 may be a touch screen and/or a touchpad. Such a configuration permits the display unit to function both as an input device and as an output device.

The touch screen may be configured to detect a touch input pressure, a touch input position, and/or a touch input area.

The display unit may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or other similar types of display. Some of such displays can be configured as transparent displays, which may include a Transparent Organic Light Emitting Diode (TOLED) display, and other similar types of displays.

The mobile terminal 100 may include two or more display units 151. For example, the mobile terminal may simultaneously include an external display unit (not shown) and an internal display unit (not shown). The audio output module 152 may output audio data that is received from the wireless communication unit 110 during a call-receiving mode, a call-placing mode, a recording mode, a voice recognition mode, a broadcast reception mode, and other similar modes. The audio output module may also output audio data stored in the memory 160. The audio output module may also output an audio signal relating to a particular function (e.g., a call or message being received) performed in the mobile terminal 100. The audio output module may be a speaker, a buzzer, or other similar component.

The alarm unit 153 may output signals notifying a user about an occurrence of certain events. Such events may include a call being received, a message being received, a key signal being input, a touch input, and other similar types of events.

The alarm unit 153 may output video and/or audio signals as well as vibration. When a call signal or text message is received, the alarm unit may output vibration to alert a user recognize the call signal or message. The call may be output via the audio output module 152 and the text message may be output via the display unit 151.

The memory 160 may store a program for processing and controlling the controller 180. The memory may temporarily store input and/or output data (e.g., phonebook data, messages, still images, video and other similar types of data). The memory may also store data related to various patterns of vibrations and audio output upon the touch input on the touch screen.

The memory 160 may be any type of suitable storage medium, such as a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and other similar types of suitable storage medium. The mobile terminal 100 may also operate in conjunction with an Internet- or web-based storage device (not shown) that performs the storage function of the memory via the Internet.

The controller 180 may control the overall operation of the mobile terminal 100. For example, the controller may perform the control and processing associated with telephone calls, data communications, video calls, and other similar forms of communication. The controller may also be configured to perform pattern recognition processing in order to recognize a writing input on the touch screen as text or a drawing input on the touch screen as an image.

The controller 180 may include a multimedia module 181, which may be configured to provide multimedia playback. The multimedia module may be configured as part of the controller or as a separate component separate from the controller.

The power supply unit 190 may provide power required by certain components under the control of the controller 180. The provided power may be internal power, external power, or combination of internal and external power.

Various embodiments described herein may be implemented in a computer-readable medium using, for example, software, hardware, or some combination of hardware and software.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination of such components. In some cases, such embodiments are implemented by the controller 180.

For software implementation, the embodiments such as procedures and functions may be implemented with separate software modules each comprising software codes that can be implemented with a software application written in any suitable programming language. Such software codes may be stored in the memory 160 and executed by the controller 180.

The mobile terminal 100 shown in FIG. 1 may be configured to operate within a communication system which transmits data via frames or packets and includes wireless communication systems, wired communication systems, and satellite-based communication systems. Such communication systems utilize different air interfaces and/or physical layers.

Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and other similar types of communication systems. By way of non-limiting example only, further description will relate to a CDMA communication system, but such description also applies to other types of communication systems.

Figure 2:
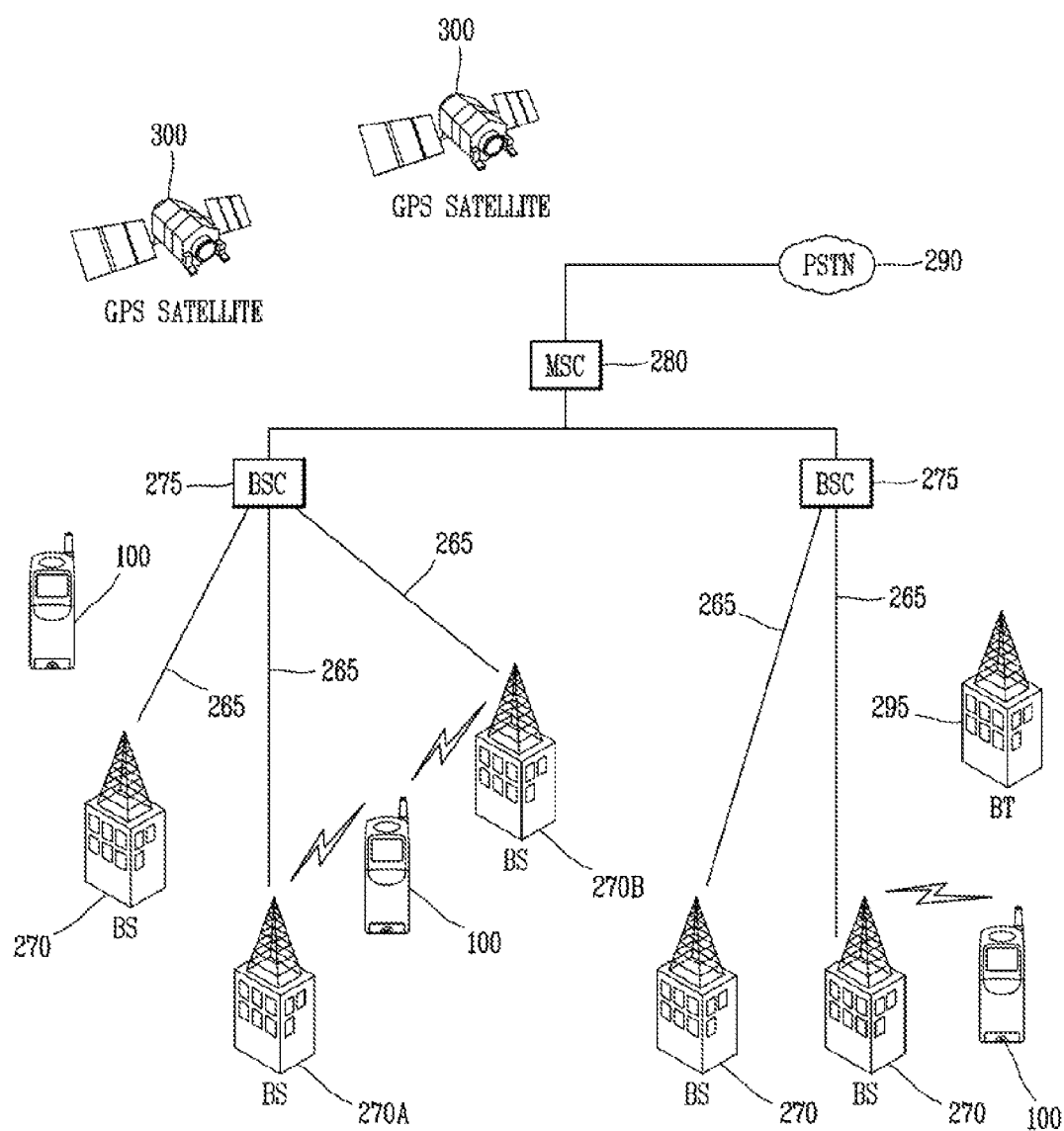
FIG. 2 is a diagram of an exemplary embodiment of a communication system in which the exemplary embodiment of the mobile terminal can operate.

Referring to FIG. 2, a CDMA wireless communication system in which the mobile terminal 100 operates may have a plurality of mobile terminals 100, a plurality of base stations (BSs) 270, a plurality of base station controllers (BSCs) 275, and a at least one mobile switching center (MSC) 280. Each MSC is configured to interface with a conventional Public Switch Telephone Network (PSTN) 290. Each MSC is also configured to interface with the plurality of BSCs.

The plurality of BSCs are coupled to the plurality of BSs via backhaul lines 265. The backhaul lines may be configured in accordance with any of several known interfaces including E1/T1, ATM, IP, PPP, Frame Relay, HDSL, ADSL, or xDSL.

Each BS 270 may include one or more sectors. Each sector may have an omni-directional antenna or an antenna pointed in a particular direction away from the BS. Alternatively, each sector may include two or more different antennas. Each BS may be configured to support a plurality of frequency assignments, with each frequency assignment having a particular spectrum (e.g., 1.25 MHz, 5 MHz, etc.).

The intersection of sector and frequency assignments may be referred to as a CDMA channel. The plurality of BSs 270 may also be referred to as a Base Station Transceiver Subsystem (BTS). The plurality of base stations may also be referred to as "cell sites."

A broadcasting transmitter (BT) 295 may be configured to transmit a broadcast signal to the plurality of mobile terminals 100 operating within the CDMA wireless communication system. The broadcast receiving module 111 (see FIG. 1) may be configured to receive broadcast signals transmitted by the BT.

FIG. 2 further depicts a plurality of Global Positioning System (GPS) satellites 300, which may facilitate locating the position of at least one of the plurality of mobile terminals 100. Although two GPS satellites are depicted in FIG. 2, it will be understood by one of ordinary skill in the relevant art that position information may be obtained with greater or fewer numbers of GPS satellites. The location information module 115 (see FIG. 1) may be configured to cooperate with the plurality of GPS satellites to obtain the desired position information.

It will be understood by one ordinary skill in the relevant art that other types of position detection technology (i.e., location technology that may be used in addition to or instead of GPS location technology) may alternatively be implemented. If desired, at least one of the plurality of GPS satellites may alternatively or additionally be configured to provide satellite Digital Multimedia Broadcasting (DMB) transmissions.

During an operation of the CDMA wireless communication system, the plurality of BSs 270 may receive sets of reverse-link signals from various mobile terminals 100. The various mobile terminals may be engaging in calls, messaging, and/or executing other communications.

Each reverse-link signal received by a given BS may be processed within that BS. The resulting data is forwarded to an associated BSC 275, which may provide call resource allocation and mobility management functionality, including orchestration of soft handoffs between various BSs. The BSC may also route the received data to the MSC 280, which may then provide additional routing services for interfacing with the PSTN 290.

The PSTN may similarly interface with the MSC. The MSC may similarly interface with the BSC, which in turn control the BS to transmit sets of forward-link signals to the mobile terminal.

A depth map 50 may be generated in real-time using two preview images. When an object is to be photographed using an out-of-focus effect, a portion of the object may be selected and a depth map may then be adjusted based on a convergence of the selected object. As the object is being captured as an image, the image may be processed by a filter (e.g., a Gaussian blur filter) based on the adjusted depth map and an out-of-focus image is ultimately generated.

The depth map 50 may be displayed on a random area of a screen of the display unit 151. The depth map may be semitransparent (e.g., processed via alpha-blending), overlapped with a preview screen, or displayed in a small window as a mini-map. The displayed depth map 50 may be further adjusted when a user changes a selection of an object in the preview image.

The depth map 50 displayed on the random area of the screen may display a negative convergence region (i.e., a negative parallax zone) that creates a visual effect of a popout and a positive convergence region (i.e., a positive parallax zone) that creates a visual effect of depth. The negative and positive convergence regions may be displayed with different colors.

As the selected object is being captured using the out-of-focus effect, the negative and positive convergence regions may appear on the depth map 50. Background processing may be performed for a portion of the object to make that portion of the object appear popped-out relative to other portions of the object.

Figure 3:
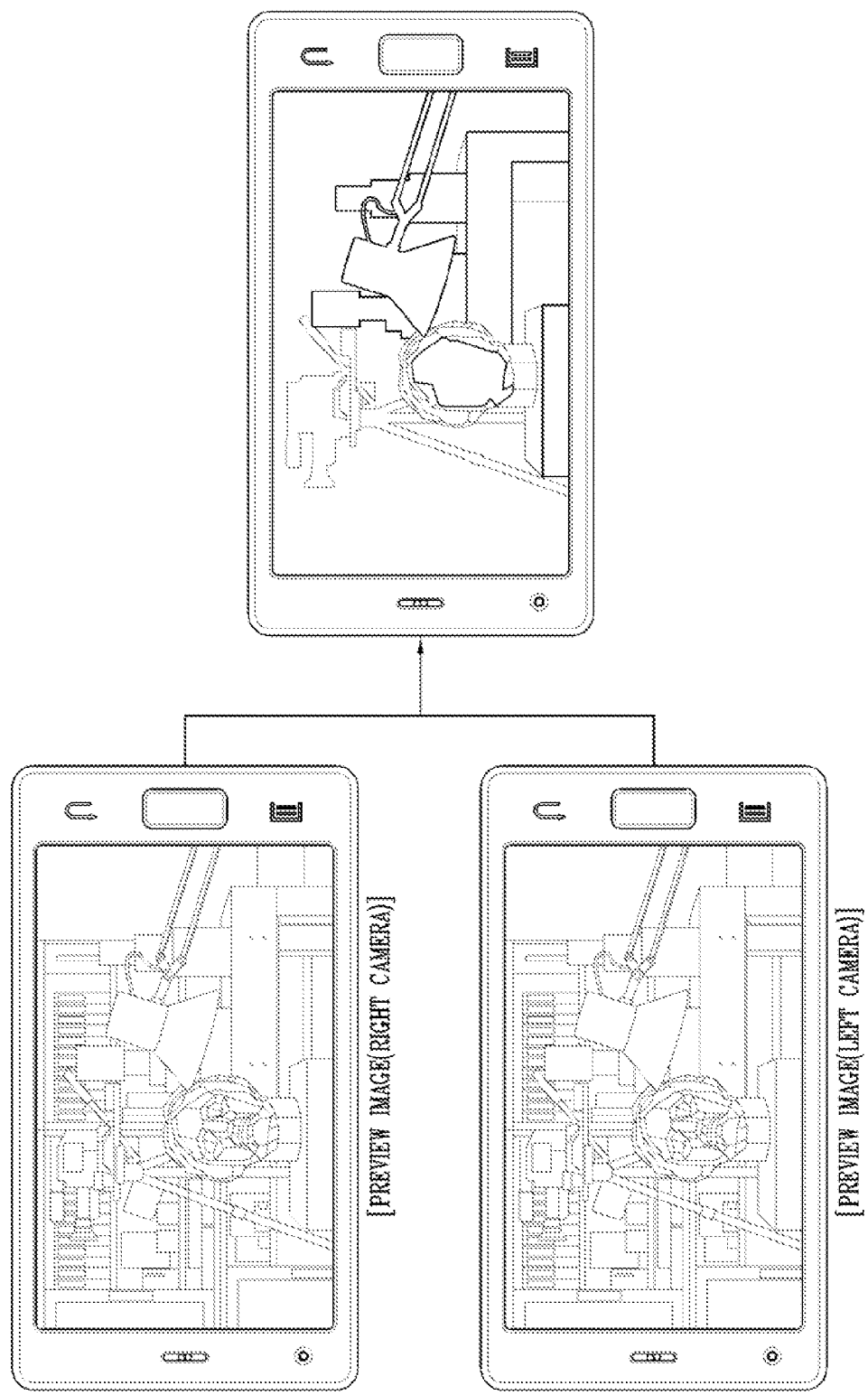
FIG. 3 is a perspective view of an exemplary embodiment of a preview image being used to generate a depth map.

As illustrated in FIG. 3, upon selection of an out-of-focus function in a camera mode of the mobile terminal 100, the controller 180 may activate two cameras 121. When the two cameras are activated, the controller may control the memory 160 or a buffer (not shown) to store input image data obtained from the activated cameras.

The controller 180 may display an image stored in one buffer on the display unit 151 as a preview image and may not display an image stored in another buffer on the display unit. The controller may generate a depth map 50 in real-time using the preview images obtained from the two cameras 121. The controller may also control the display unit to display the generated depth map on one side of the preview image. The preview image may be obtained via a left or right camera, may be displayed on the display unit, and may be selected by a user.

Figure 4:
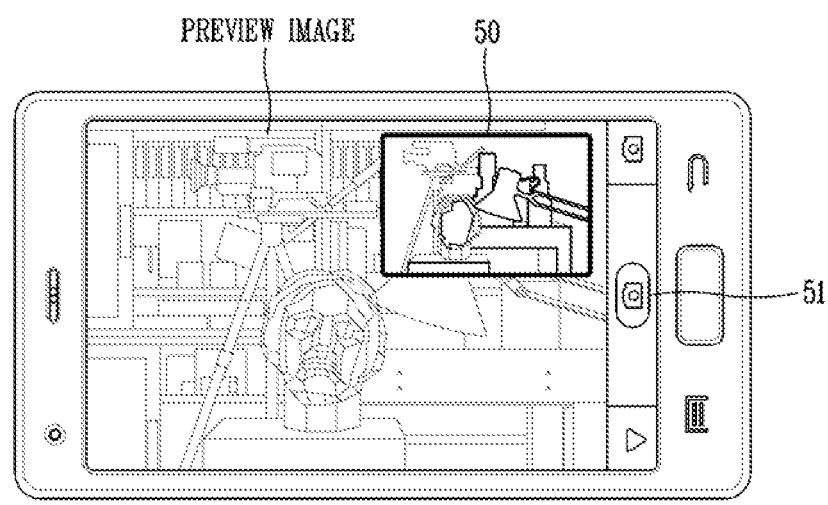
FIG. 4 is a perspective view of an exemplary embodiment of a generated depth map displayed on a side of a screen.

An exemplary embodiment of a depth map 50 is shown in FIG. 4. The depth map may be displayed on an upper-right portion of a screen and in the form of a mini-map. The depth map may, alternatively, be displayed on a lower-right, upper-left, or upper-right portion of the screen. Alternatively, the depth map may be displayed in an overlapping manner on a preview image displayed on the screen in a semitransparent form (e.g., processed via alpha-blending).

The size, shape, color and display time of the depth map may be set by a menu that is displayed when an edge of the depth map is directly touched. Alternatively, the size of the depth map 50 may be adjusted via a touch-and-drag input.

Figure 5:
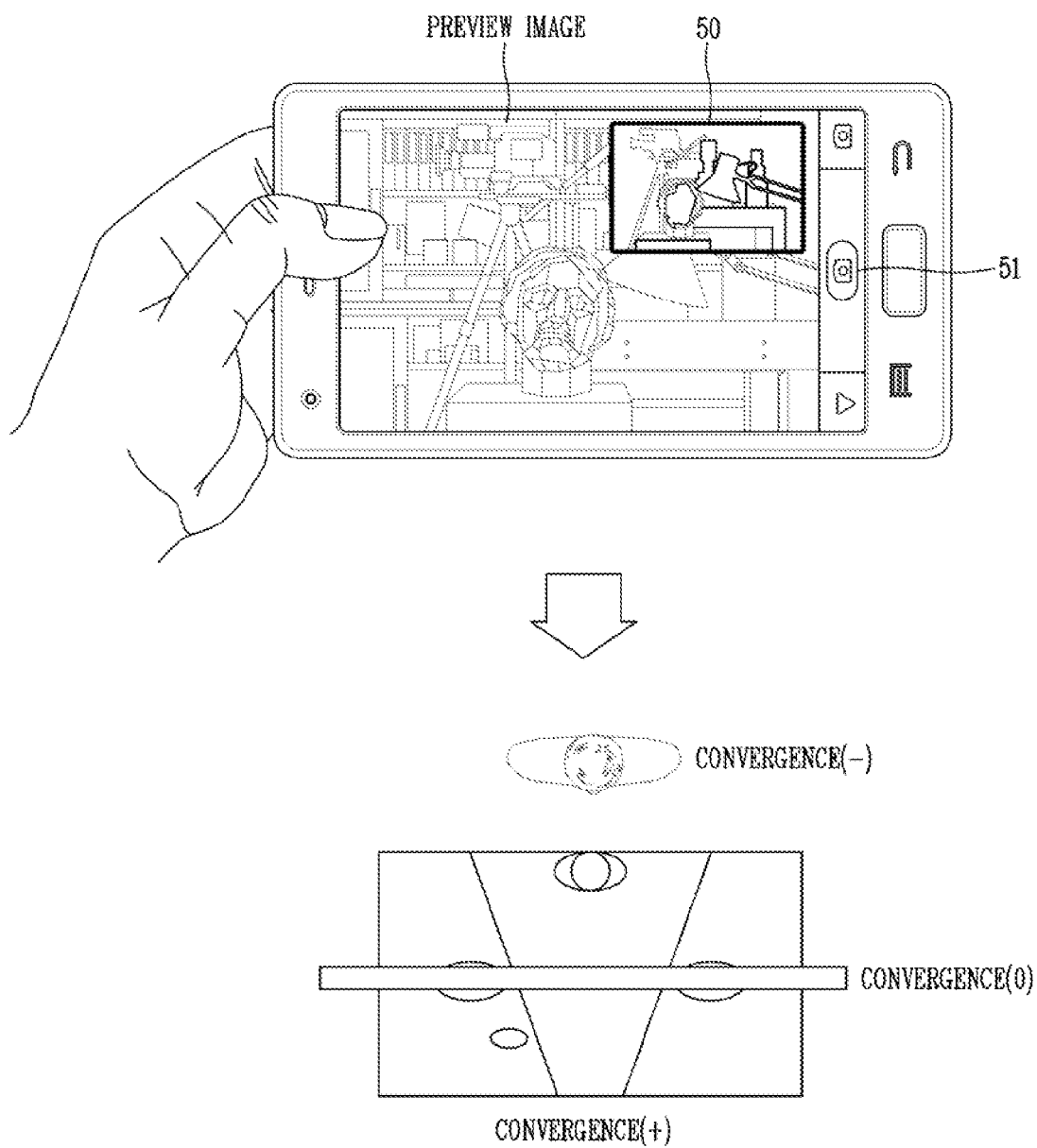
FIG. 5 is a perspective view of an exemplary embodiment of a generated depth map being adjusted when a specific object is selected from the displayed preview image.

Referring to FIG. 5, when a user selects a specific object to be captured, the controller 180 may set a corresponding object displayed on the depth map to a zero-point of convergence. The controller may then control the display unit 151 to display a negative convergence region (i.e., a pop-out region) and a positive convergence region (i.e., a depth region) based on the set zero-point of convergence. The negative and positive convergence regions may be displayed using different colors to facilitate identification of the different regions.

Figure 6:
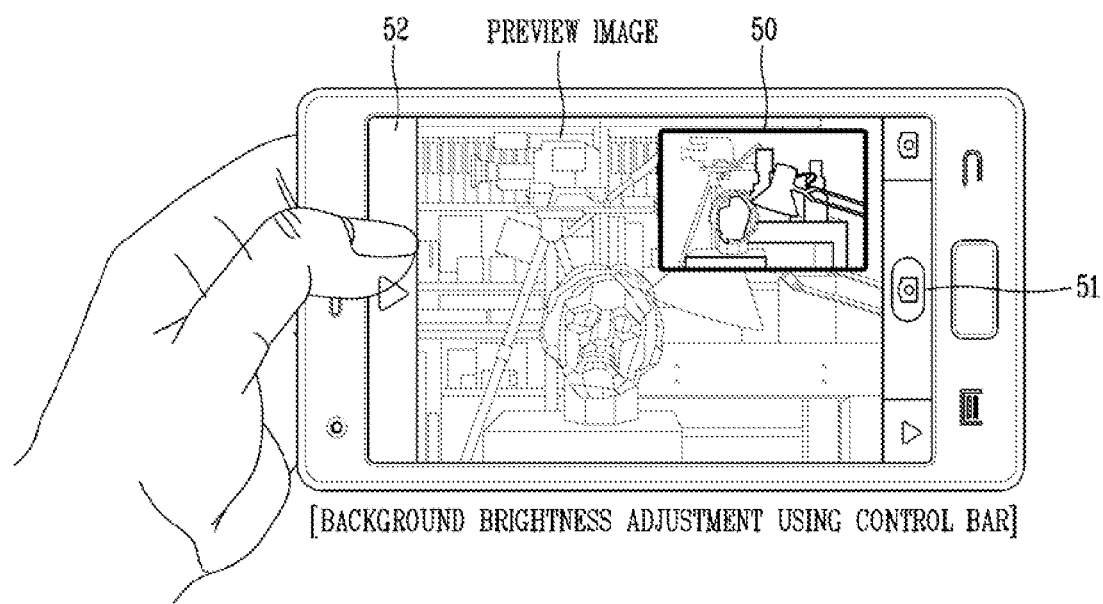
FIG. 6 is a perspective view of an exemplary embodiment a background region of the displayed preview image being blurred via a control bar.

As shown in FIG. 6, a control bar 52 configured for controlling a blurring level of a background region (i.e., the positive convergence region) may be provided at one side of the preview image or depth map 50. The user may scroll the control bar to adjust the blurring level of the background region. As the control bar is scrolled, the blurring level of the background region may be adjusted and displayed on the depth map.

For example, a lighter-colored portion of the control bar may correspond to less blurring of the background region and a darker-colored portion of the control bar may correspond to more blurring of the background region. The user may control the blurring level of the positive convergence region by adjusting the control bar. Accordingly, the level of blurring selected by the user may be reflected in the displayed depth map 50.

A capture button 51 (see FIGS. 4-6) may be located at a side of a preview screen. The capture button may be used to focus on an object selected on the preview screen that is to be captured by a camera 121.

Figure 7:
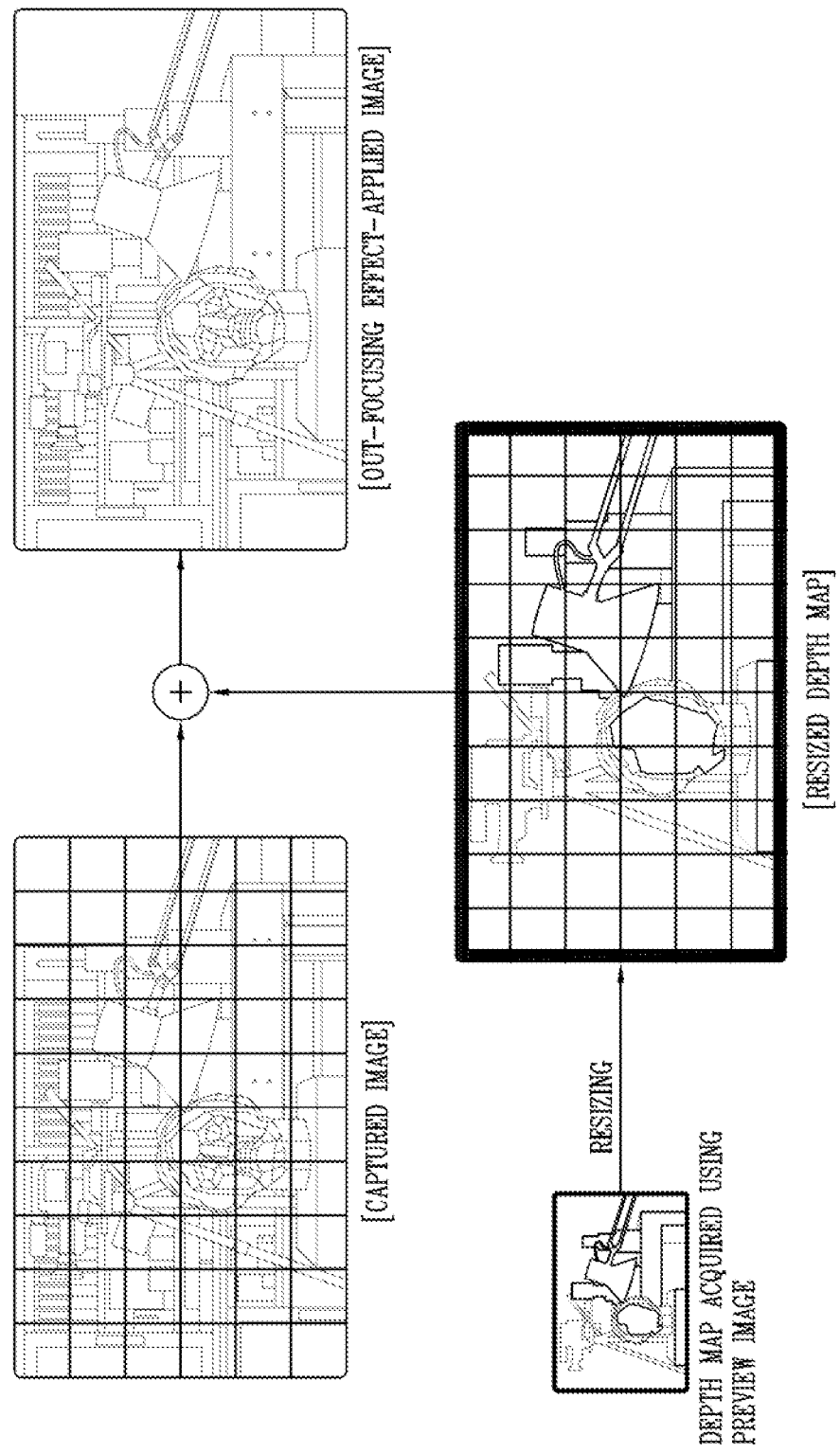
FIG. 7 is a perspective view of an exemplary embodiment of captured image and a re-sized depth map being used to generate an out-of-focus image.

Referring to FIG. 7, the controller 180 may capture an image via one camera 121 of two provided cameras and resize the depth map 50 generated on the preview screen to match the size of the captured image. The controller may also combine the acquired image and the resized depth map in order to apply the out-of-focus effect to the captured image.

The out-of-focus captured image may be generated based on the resized depth map 50. This process may be performed via a comparison process via block units or pixel units.

When the comparison is performed via block units, the controller 180 may divide the captured image into N blocks, divide the resized depth map 50 into M blocks, and compare the N and M blocks with each other. FIG. 7 illustrates an exemplary method of generating the out-of-focus image using the comparison process via block units.

When the comparison is performed via pixel units, the controller 180 may compare each pixel of the captured image with each pixel of the resized depth map 50. When the out-focused image is generated by comparing the pixel units, the resized depth map and the captured image may be similarly sized images, thereby allowing for improved blurring at the edges of the images.

Upon completion of the comparison process, filtering (e.g., Gaussian blur filtering) may be performed to blur blocks or pixels corresponding to the positive convergence region without changing the negative convergence region. When filtering has been is completed, the controller 180 may generate an out-of-focus image and subsequently process the out-of-focus image using a codec.

Figure 8:
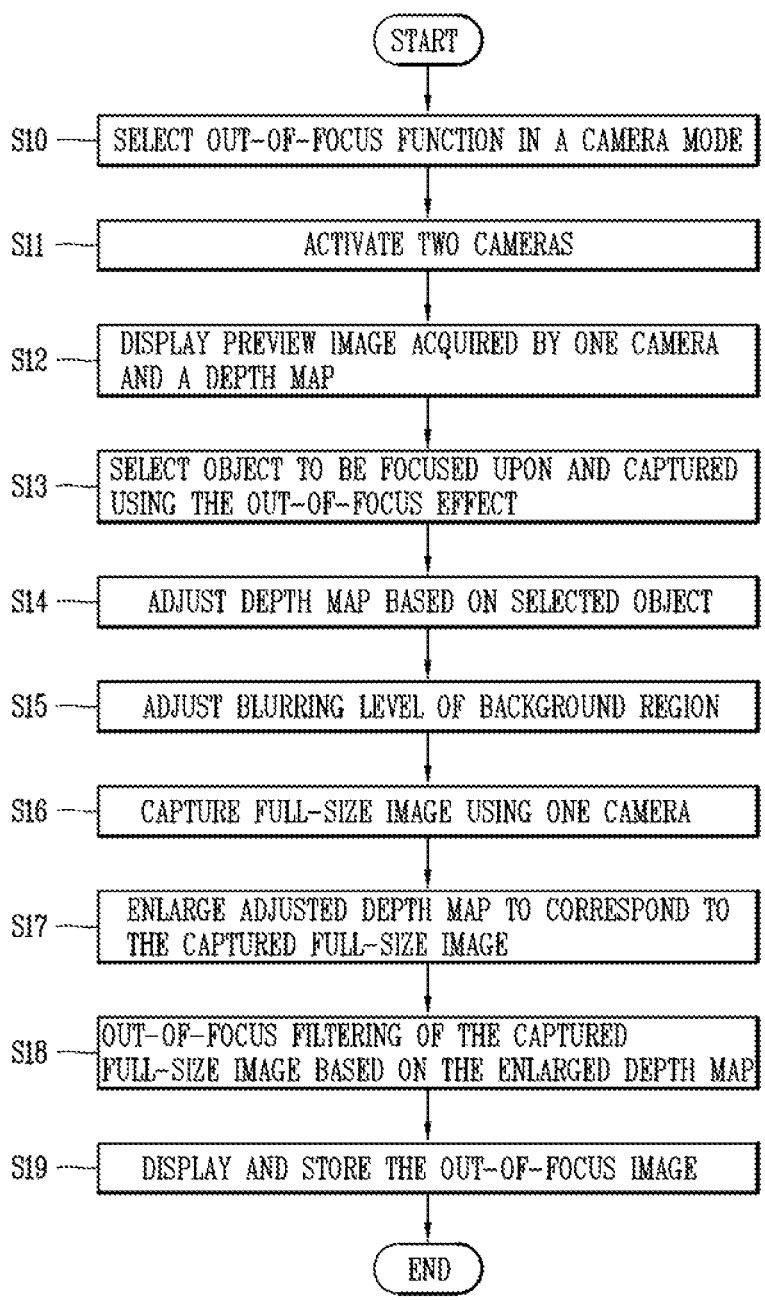
FIG. 8 is a flowchart illustrating an exemplary embodiment of a method for generating an out-of-focus image from a captured image.

As shown in FIG. 8, when a user selects an out-of-focus function in a camera mode (S10), the controller 180 may activate two cameras 121 (e.g., a left camera and a right camera) (S11). The controller may store preview images acquired by the respective cameras in the memory 160.

The controller may display a depth map 50 and an image obtained by one of the two cameras as a preview image (S12). The depth map may be displayed together with the preview image when the out-of-focus function is selected.

The controller may receive a selection of an object displayed on a preview image to be focused upon and captured using the out-of-focus effect (S13). Based on the selection of the object, the controller may adjust the depth map (S14). The adjusted depth map may show a negative convergence region as a different color than a color shown for a positive convergence region. The user may adjust a blurring level for the background region (i.e., a positive convergence region) on the depth map 50 (S15) using the control bar 52.

When the user engages the capture button 51, the controller 180 may capture a full-size image using one of the two cameras (S16). Upon acquiring the full-size image, the controller may divide the adjusted depth map 50 into blocks and enlarge each block of the adjusted depth map to correspond to the full-size image (S17). In other words, the adjusted depth map may be resized to a size similar to a size of the captured full-size image.

The controller 180 may also perform out-of-focus filtering of the captured full-size image based on the enlarged depth map (S18). Out-of-focus filtering may be performed via Gaussian blur filtering, whereby portions (e.g., blocks or pixels) corresponding to the positive convergence region are blurred but the negative convergence region is unchanged.

The out-of-focus filtering can generate the out-of-focus image. The generated out-of-focus image may then be stored in the memory 160 and/or displayed on the display unit 151.

Figure 9:
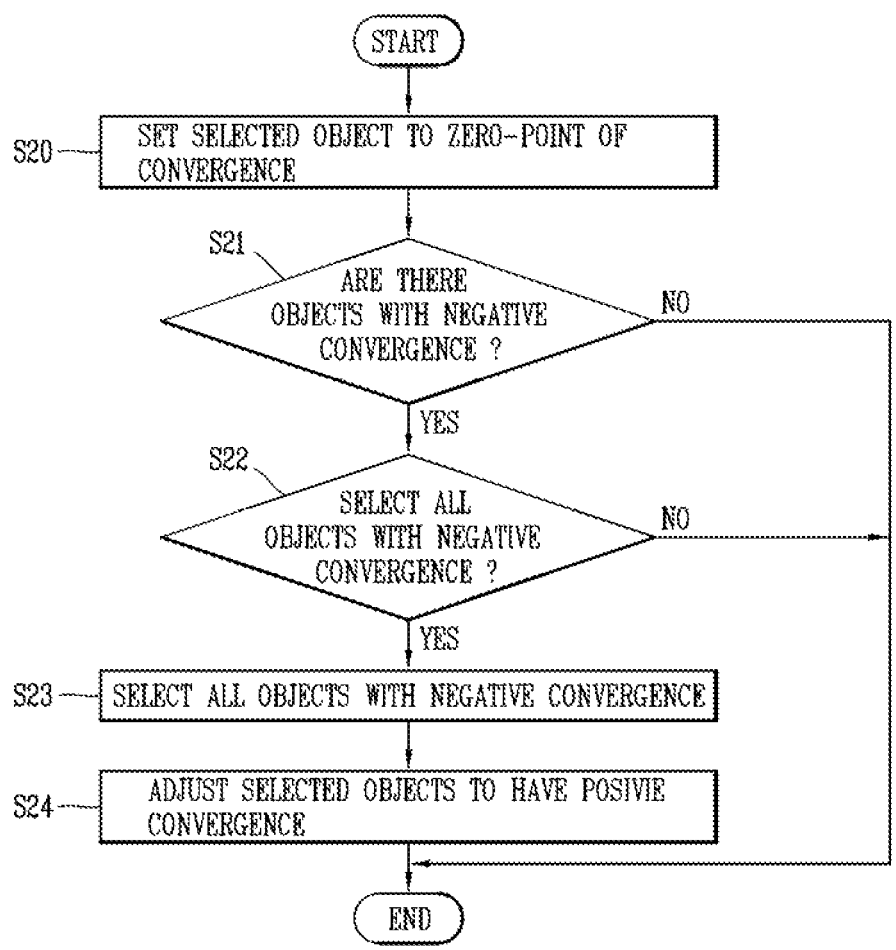
FIG. 9 is a flowchart illustrating an exemplary embodiment of a method for adjusting a depth map for objects with a negative convergence region.

As shown in FIG. 9, the controller 180 may set the corresponding object to the zero-point of convergence (S20). The controller may also determine whether any object has a negative convergence (S21).

If objects with negative convergence are present, the controller may display a message to the user inquiring whether to select all objects with negative convergence. The user may then select all of the objects with negative convergence (S22). If the user decides to select all objects with negative convergence, the controller 180 may select the objects with negative convergence and adjust the selected objects to have positive convergence relative to the zero-point of convergence (S23 and S24).

The image generating method described so far has been illustrated with respect to still images. However, the present disclosure is not be limited to only still image and may be applicable to moving images or videos as well.

Figure 10:
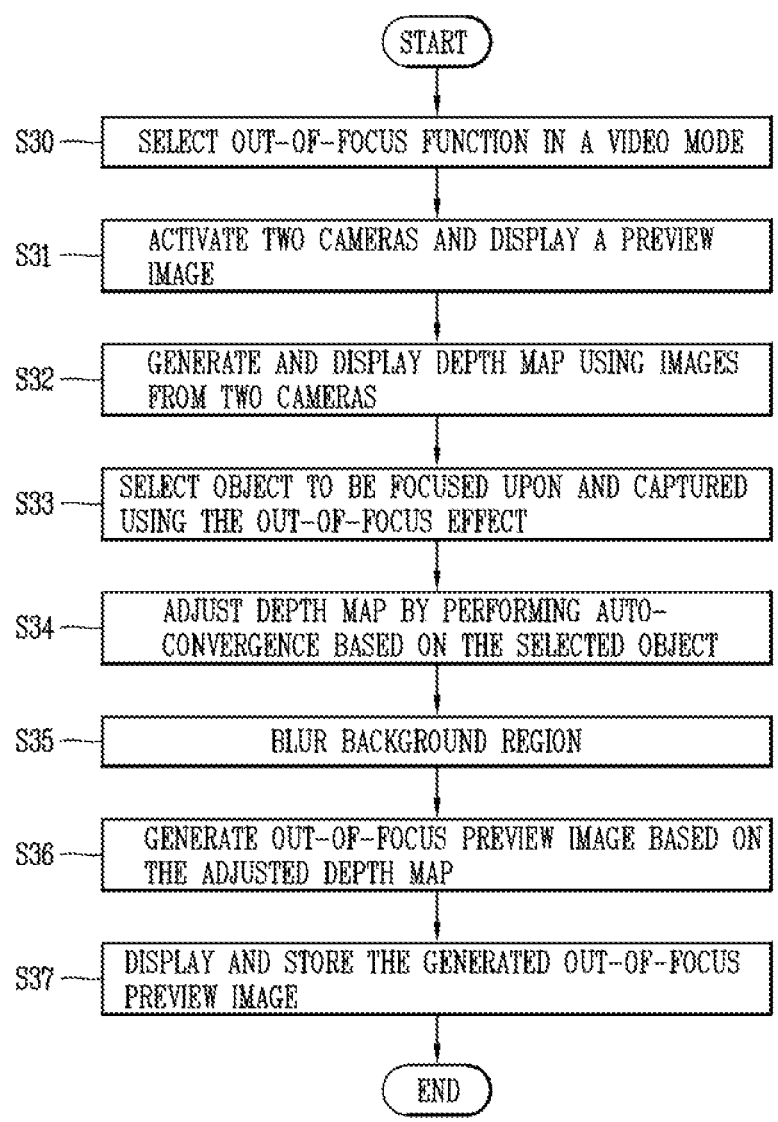
FIG. 10 is a flowchart illustrating an exemplary embodiment of a method for generating an out-of-focus effect for a moving image or video.

As shown in FIG. 10, a user may select an out-of-focus function in a video mode (S30). The controller 180 may then activate two cameras 121 and display a preview image on the display unit 151 (S31). The controller may then generate a depth map using images acquired from the two activated cameras and display the generated depth map on the display unit (S32).

An object to be focused upon and captured using the out-of-focus effect may be selected from the preview screen (S33). The controller 180 may then set the selected object as a zero-point of convergence.

The controller 180 may then adjust the depth map 50 by performing auto-convergence based on the selected object (S34). When an object-tracking mode or a face-recognition mode is set, the controller may perform the object-tracking or the face-recognition for the selected object in real-time. When the controller is set to a continuous Auto-Focusing (AF) state, the controller may set an in-focused portion as the zero-point of convergence while performing the continuous AF of the two cameras 121.

Once the depth map 50 is adjusted, the controller 180 may divide the depth map into N blocks and divide the preview image into M blocks. The controller may then blur a background region (i.e., a negative convergence region) of each block of the preview image (S35).

The controller may also sharpen a positive convergence region. The controller may also generate an out-of-focused preview image based on the adjusted depth map (S36). Also, the controller may selectively blur the positive convergence region by further adjusting of the depth map.

The generated out-of-focus preview image may be displayed on a screen and/or stored in the memory 160 (S37). For example, when a user presses a recording button, the controller 180 may control the memory to store the generated out-of-focus preview image in the memory after compressing it with a codec.

For displaying a video preview, a displayed object may be moving, unlike display still image. It therefore may be more difficult to adjust a blurring level using the same method as the blurring method applied for a still image. To accommodate such differences, a method that involves separately windowing a moving object when a video is captured may be provided. As such, problems associated with adjusting the blurring level of the moving object can be reduced.

In accordance with at least one embodiment of the present disclosure, the method can be implemented as computer-readable codes in a program-recorded medium. The computer-readable medium may include all types of recording devices, each device storing data readable by a computer system.

Examples of such computer-readable medium may include ROM, RAM, CD-ROM, magnetic tape, floppy disk, optical data storage element and other similar types of computer-readable medium. The computer-readable medium may also be implemented as carrier waves that may be transmitted via the Internet. The computer may include the controller 180.

The configurations and methods of the mobile terminal 100 in the foregoing embodiments are not limitations or requirements. Such embodiments may be configured as combinations of all or part of the each other without deviating from the scope of the present invention.

The foregoing embodiments and advantages are merely exemplary and are not to be construed as limiting the present invention. The present invention can be applied to other types of apparatuses.

The foregoing description is intended to be merely illustrative and is not intended to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The features of the present invention may be embodied in several forms. It will be understood by one of ordinary skill in the art that the foregoing embodiments are not limited by any of the details of the foregoing description. The description provided herein should be construed broadly within the scope of the appended claims.

What is claimed is:

1. A method for generating an out-of-focus image in a mobile terminal, the method comprising:
receiving a selection of an out-of-focus function;
displaying a preview image and a depth map on a display unit of the mobile terminal when the out-of-focus function is selected;
receiving a selection of a specific object from the displayed preview image;
adjusting the displayed depth map based on a convergence of the specific object when the specific object is selected;
capturing an image using at least one camera of the mobile terminal; and
generating an out-of-focus image by blurring the captured image based on the adjusted depth map,
wherein adjusting the displayed depth map comprises:

setting the selected specific object as a zero-point of convergence;

determining whether one or more objects with a negative convergence are present in at least the displayed preview image or displayed depth man;

displaying the one or more objects on a screen of the mobile terminal when the one or more objects are present;

extracting the displayed one or more objects when no user selection of the displayed one or more objects is received within a specific period of time;

resetting a convergence of the extracted one or more objects to a positive convergence relative to the zero-point of convergence; and adjusting the depth map based on the reset positive convergence of the extracted one or more objects.

2. The method of claim 1, wherein the displayed preview image is at least a still image or a video.

3. The method of claim 1, further comprising:

generating the displayed depth map from preview images each acquired from one of two cameras of the mobile terminal when the out-of-focus function is selected or the specific object is selected.

4. The method of claim 1, wherein the depth map is displayed as a mini-map at a side of the displayed preview image.

5. The method of claim 4, wherein the depth map is displayed semi-transparently and overlapping the displayed preview screen.

6. The method of claim 1, wherein the displayed depth map comprises a size, a shape, a color and a display time that are either initially set via a first menu or set via a second menu when the displayed depth map is selected.

7. The method of claim 1, wherein:

the displayed depth map includes a negative convergence region and a positive convergence region; and a color of the negative convergence region is different than a color of the positive convergence region.

8. The method of claim 1, further comprising:

displaying a control bar at a specific area of the displayed preview image or displayed depth map;

process an input to move the displayed control bar; and adjusting the displayed depth map in order to change a blurring level of a background region of the displayed preview image in response to the input to move the displayed control bar.

9. The method of claim 1, wherein generating the out-of-focus image comprises:

enlarging the display of the adjusted depth map to a size that is similar to a size of the captured image;

comparing the captured image to the enlarged depth map based on block units or a pixel units; and performing filtering to blur a positive convergence region of the captured image according to the enlarged display of the depth map.

10. The method of claim 9, wherein filtering is performed via Gaussian blur filtering.

11. A mobile terminal comprising:

a display unit configured to display information;

at least one camera configured to capture an image;

a memory configured to store the captured image; and a controller configured to:

process a selection of an out-of-focus function, control the display unit to display a preview image and a depth map, process a selection of a specific object from the displayed preview image, control the display unit to adjust the displayed depth map based on a convergence of the specific object when the specific object is selected, control the at least one camera to capture the images, and generate an out-of-focus image by blurring the captured image based on the adjusted depth map, wherein adjusting the displayed depth map comprises:

setting the selected specific object as a zero-point of convergence;

determining whether one or more objects with a negative convergence are present in at least the displayed preview image or displayed depth map;

displaying the one or more objects on a screen of the mobile terminal when the one or more objects are present;

extracting the displayed one or more objects when no user selection of the displayed one or more objects is received within a specific period of time;

resetting a convergence of the extracted one or more objects to a positive convergence relative to the zero-point of convergence; and adjusting the depth map based on the reset positive convergence of the extracted one or more objects.

12. The terminal of claim 11, wherein the displayed preview image is at least a still image or a video.

13. The terminal of claim 11, wherein the controller is further configured to:

generate the displayed depth map from preview images acquired by two cameras of the mobile terminal when the out-of-focus function is selected or the specific object is selected.

14. The terminal of claim 11, wherein the controller is further configured to control the display unit to display the depth map as a mini-map at a side of the displayed preview image.

15. The terminal of claim 11, wherein the controller is further configured to control the display unit to display the depth map semi-transparently and overlapping the displayed preview screen.

16. The terminal of claim 11, wherein the displayed depth map comprises a size, a shape, a color and a display time that are either initially set via a first menu or set via a second menu when the displayed depth map is selected.

17. The terminal of claim 11, wherein:

the displayed depth map includes a negative convergence region and a positive convergence region; and a color of the negative convergence region is different than a color of the positive convergence region.

18. The terminal of claim 11, wherein the controller is further configured to:

control the display unit to display a control bar at a specific area of the displayed preview image or displayed depth map, process an input to move the displayed control bar; and adjust the displayed depth map in order to change a blurring level of a background region of the displayed preview image in response to the input to move the control bar.

19. The terminal of claim 11, wherein the controller is further configured to:

enlarge the display of the adjusted depth map to a size that is similar to a size of the captured image;

compare the captured image to the enlarged depth map based on block units or pixel units; and perform filtering to blur a positive convergence region of the captured image according to the enlarged display of the depth map.

20. The terminal of claim 19, wherein filtering is performed via Gaussian blur filtering.

21. The terminal of claim 11, further comprising a control bar that is located at a specific area of the display unit and configured to control a blurring level of a background region of the displayed preview image.

\* \* \* \* \*